United States Patent [19]

Kendall et al.

[11] 4,379,736

[45] Apr. 12, 1983

[54] METHOD AND APPARATUS FOR INHIBITING THE FORMATION OF POLYMERIZED VINYLAROMATIC COMPOUNDS DURING DISTILLATIVE PURIFICATION OF VINYLAROMATIC MONOMER

[75] Inventors: Debra L. Kendall; James M. Watson; Danny P. Wright, all of Big Spring, Tex.

[73] Assignee: Cosden Technology, Inc., Dallas, Tex.

[21] Appl. No.: 333,604

[22] Filed: Dec. 23, 1981

[51] Int. Cl.³ .............................................. B01D 3/32
[52] U.S. Cl. ........................................ 203/9; 203/86; 203/91; 202/158; 202/267 R; 202/154; 261/114 R; 261/114 TC; 585/800
[58] Field of Search .......... 203/9, 91, 86, 8, DIG. 22, 203/74, 77, 80; 261/114 R, 114 TC; 202/267, 158, 154; 585/1-5, 806, 800, 807, 860, 808, 809, 832, 920, 921, 950; 422/240, 241

[56] References Cited

U.S. PATENT DOCUMENTS

| | | | |
|---|---|---|---|
| 2,399,340 | 4/1946 | Franz | 203/9 |
| 2,888,386 | 5/1959 | Brower | 203/9 |
| 2,978,387 | 4/1961 | Chapman | 203/86 |
| 3,717,553 | 2/1973 | Otsuki et al. | 203/9 |
| 3,988,213 | 10/1976 | Yoshida et al. | 203/9 |
| 4,118,285 | 10/1978 | Yeh | 203/86 |
| 4,177,110 | 12/1979 | Watson | 203/9 |
| 4,207,276 | 6/1980 | Ronkainen et al. | 203/86 |

Primary Examiner—Wilbur L. Bascomb, Jr.

[57] ABSTRACT

A method and apparatus for inhibiting polymerization of vinylaromatic compounds during distillative purification wherein downcomers and tray bottoms of the distillation column exposed to high concentrations of liquid monomer condensate and low vapor velocities are coated with a non-wetting fluorocarbon polymer.

15 Claims, 3 Drawing Figures

METHOD AND APPARATUS FOR INHIBITING THE FORMATION OF POLYMERIZED VINYLAROMATIC COMPOUNDS DURING DISTILLATIVE PURIFICATION OF VINYLAROMATIC MONOMER

BACKGROUND OF THE INVENTION

This invention relates to a process and apparatus for producing readily polymerizable vinylaromatic compounds. More particularly, this invention relates to a process and apparatus for inhibiting the formation of undesired accumulations of polymeric material in a distillation apparatus during distillative purification of vinylaromatic monomers.

Vinylaromatic monomers, such as styrene, alpha-alkylstyrene, vinyltoluene, divinylbenzene and the like, are important for their ability to form useful polymeric materials. These compounds are typically prepared by catalytic dehydrogenation of alkylaromatic compounds having corresponding carbon chains. The crude product of the dehydrogenation reaction, however, is a mixture of materials comprising in addition to the desired vinylaromatic monomer, various alkylaromatic compounds as well as oligomers of the desired monomer. These other substances must be separated from the vinylaromatic monomer to obtain a commercially acceptable product.

The usual method for separating a desired vinylaromatic monomer from the dehydrogenation product mixture is to pass the mixture through a distillation train in which lower boiling materials are first separated and then the desired monomer is distilled from the higher boiling materials. Such distillative separations are complicated by the fact that the tendency of the monomer to polymerize increases with increasing temperature. Consequently, as the mixture is heated to distill it, the formation of undesired polymer increases and the yield of desired monomer decreases.

Masses of unwanted polymeric material thus accumulate in the distillation apparatus. The continuing accumulation of these undesired polymeric materials requires that a distillation apparatus used to purify vinylaromatic monomers be periodically shut down and cleaned of the fouling polymer. As the polymer is typically a dense hard material, considerable difficulty is encountered in cleaning the distillation apparatus. The need for periodic cleaning contributes substantially to operating costs, and capital costs are also increased because additional distillation capacity must be constructed in order to compensate for the down time of the distillation apparatus.

Not only is the yield of monomer decreased and the productivity of equipment lessened by reducing effective capacity and by requiring periodic shutdowns for cleaning, but the insoluble residues produced by the undesired polymerization of the monomer constitute a waste material which must be disposed of. Governmental restrictions on waste disposal make this an ever increasing problem.

Various measures have been utilized to minimize the undesired polymer formation and the resulting fouling of the distillation column. Vacuum distillation has been used to reduce the temperature to which the feed mixture must be heated. While this is helpful in reducing the formation of undesired polymeric material, substantial amounts of polymer still are formed.

Polymerization inhibitors have been added to the feed mixture. Known inhibitors further reduce the formation of undesired polymer, but still are not totally effective. Moreover, such inhibitors may be expensive and contribute substantially to the production costs for the vinylaromatic monomer.

A particular problem arises in the distillation apparatus in areas of high concentrations of liquid condensate and low vapor velocity, such as adjacent the tray bottoms and along the downcomers. Vapor phase active inhibitors are not totally effective in suppressing the formation of deposits in such areas because the inhibitor is restricted in mixing with the condensing vapor due to low vapor velocity. Because liquid phase active inhibitors are not carried with the monomer as it vaporizes, the liquid condensate is largely free of these polymerization inhibitors. Condensate droplets which form against the cooler tray bottoms, thus, may polymerize and solidify before they grow large enough to drop into the underlying tray. Polymerization also tends to occur in the downcomer since there is a high concentration of liquid monomer condensate, little or no polymerization inhibitor and a low vapor velocity. Consequently, monomer droplets can attach to the downcomer walls, and as the condensate droplets remain on the wall, polymerization occurs and the column becomes fouled.

U.S. Pat. No. 4,207,276 discloses placing a polytetrafluoroethylene coating on the inner surfaces of bubble-caps and the inner and outer surfaces of the bubble cap necks to prevent clogging. The principal function of the coating is to facilitate ready separation of fouling deposits after they have formed. Preventing formation of the deposits in the first place is not a consideration. These are high vapor velocity areas. A high vapor velocity not only allows for mixing of inhibitor with the vapors, but also discourages attachment of condensing vapor to the inner surfaces of the column due to vapor agitation, and further acts as a sweep to remove attaching condensate droplets from the column surfaces. Because of this above-mentioned vapor action, however, the inhibition of polymerization in low vapor velocity areas presents a different problem, and different considerations come into play.

Despite the efforts of the prior art, there remains a substantial need for improved methods and apparatus for inhibiting the initial formation of undesired polymeric residues in distillation apparatus used to purify vinylaromatic monomers, particularly in areas such as on the tray bottoms and in the downcomers, where high concentrations of condensate and low vapor velocities are encountered.

SUMMARY OF THE INVENTION

Accordingly, it is an object of the present invention to provide an improved method and apparatus for inhibiting the formation of polymerized vinylaromatic compounds during distillative purification of a crude vinylaromatic monomer feed.

Another object of the present invention is to provide a method and apparatus for inhibiting the formation of polymerized vinylaromatic compounds which will not increase the need for expensive chemical inhibitors.

A further object of the present invention is to provide a method and apparatus for inhibiting the formation of polymerized vinylaromatic compounds which will permit distillation systems used to purify vinylaromatic monomers to be run for longer periods before shutdown for cleaning becomes necessary.

A still further object of the present invention is to provide a method and apparatus for distilling a vinylaromatic compound which facilitate removal of polymer accumulations.

It is also an object of the present invention to provide method and apparatus for inhibiting the formation of polymerized vinylaromatic compounds which are especially effective in areas of the distillation apparatus where liquid condensate droplets tend to form in the absence of significant vapor velocity.

Yet another object of the present invention is to provide a method and apparatus for inhibiting the formation of polymerized vinylaromatic compounds during distillative purification of a vinylaromatic monomer which will increase the yield of monomer.

A further object of the present invention is to provide a method and apparatus for inhibiting the formation of polymerized vinylaromatic compounds during distillative purification of vinylaromatic monomer which will decrease the amount of residues which need to be disposed of.

An additional object of the present invention is to provide a method and apparatus for purifying a vinylaromatic monomer which will decrease the formation of undesired soluble and insoluble polymer by-products.

A still further object of the present invention is to provide a method for distilling a vinylaromatic monomer which inhibits fouling of the distillation column and an apparatus for distilling a vinylaromatic monomer which is less prone to fouling.

It is also an object of the present invention to provide a method and apparatus for producing substantially pure vinylaromatic monomer which is more economical than prior art methods.

These and other objects of the invention are achieved by providing a method for inhibiting the formation of polymerized vinylaromatic compounds during distillative purification of vinylaromatic monomer from a crude feed comprising vinylaromatic monomer admixed with lower and higher boiling materials comprising distilling the vinylaromatic monomer from the crude feed in a column wherein at least one area selected from the group consisting of the downcomers and the tray bottoms is coated with a fluorocarbon polymer.

The objects of the invention are also achieved by providing apparatus for inhibiting the formation of polymerized vinylaromatic compounds during distillative purification of vinylaromatic monomer from a crude feed comprising vinylaromatic monomer admitted with lower and higher boiling materials, said apparatus comprising a distillation column in which at least one area selected from the group consisting of the downcomers and the tray bottoms is coated with a fluorocarbon polymer.

The present invention achieves the foregoing objects by coating the appropriate metal surfaces in the interior of the distillation column with fluorocarbon polymers. The coated surfaces provide a non-wetting surface, and therefore the liquid condensate droplets do not adhere to the surfaces but rapidly detach from the surface as a result of gravitational forces. Due to the resulting short residence time of the liquid monomer on the coated surface, no significant polymerization will occur.

BRIEF DESCRIPTION OF THE DRAWINGS

The invention will be further explained with reference to the accompanying drawings wherein.

DETAILED DESCRIPTION OF PREFERRED EMBODIMENTS

Figure 1:
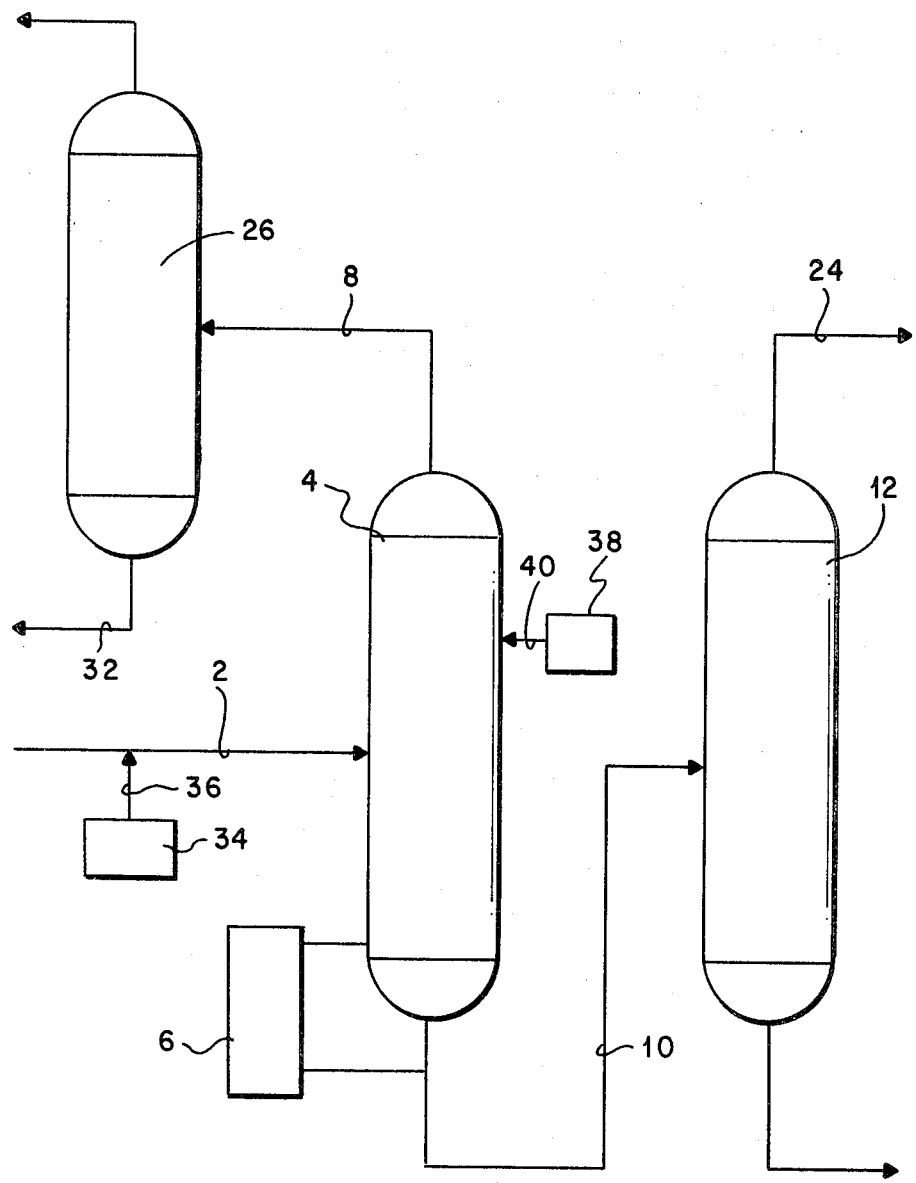
FIG. 1 is a schematic representation of a distillation system for purifying a crude vinylaromatic monomer.

Referring now to the drawings, FIG. 1 schematically illustrates a distillation system for purifying crude vinylaromatic monomer. The illustrated system will be described in conjunction with the distillation of vinyltoluene, but it is understood that the distillation system and the invention are useful for purifying other vinylaromatic monomers such as styrene, alpha-methylstyrene, divinylbenzene and the like. It is considered within the skill of the art to adjust the operating parameters as necessary to adapt the system to other vinylaromatic monomers.

A crude vinyltoluene feed recovered from the dehydrogenation of ethyltoluene is condensed and introduced through line 2 into the intermediate portion of a recycle distillation column 4. Recycle column 4 is a conventional multi-tray distillation column containing suitable vapor/liquid contact devices such as bubble cap trays, perforated trays, valve trays, etc. Preferably, the distillation column is of the parallel distillation path design. Typically, the number of trays in recycle column 4 will range between 40 and 100. Preferably at least 72 trays are provided in the recycle column in order to facilitate proper separation of the constituents of the crude vinyltoluene feed mixture.

The recycle column is typically operated at temperatures ranging between about 65 and about 138° C. and at absolute pressures ranging from about 0.013 to about 0.26 atmospheres (10 to 200 mm Hg). Preferably, distillation temperatures in the recycle column lie between about 90 and about 115° C. and the pressure is maintained between about 0.025 and about 0.04 atmospheres (20 to 30 mm Hg) in the overhead. A reboiler 6 is associated with distillation column 4 to provide the heat necessary to maintain distillation conditions in the column. Reboiler temperatures are maintained between about 52 and about 121° C. by controlling the reboiler pressure between about 0.04 and about 0.53 atmospheres (30 to 440 mm Hg).

A recycle overhead fraction comprising principally a mixture of lower boiling alkylaromatic compounds such as ethyltoluene, xylene and toluene is withdrawn from the top of recycle column 4 through line 8.

The recycle bottoms fraction comprising principally vinyltoluene admixed with higher boiling materials such as vinyltoluene oligomers is withdrawn from the bottom of recycle column 4 through line 10.

The recycle overhead fraction is introduced into an alkylbenzene column 26. The alkylbenzene column bottoms fraction, comprising principally the vinyltoluene precursor ethyltoluene, is withdrawn from the bottom of alkylbenzene column 26 through line 32, dehydrogenated to produce additional vinyltoluene and introduced again into recycle column 4.

The recycle bottoms fraction is introduced into finish distillation column 12, where it undergoes further purification by removing high boiling tarry residue to produce substantially pure vinyltoluene which leaves the finish distillation column 12 through line 24.

The downcomers and tray bottoms and other areas in the interior of the distillation column exposed to high concentrations of vapor condensate and low vapor velocities may be covered with a fluorocarbon polymer coating. Useful fluorocarbon polymers include polytetrafluoroethylene (PTFE); polyvinylidene fluoride (PVDF); polymers of chlorotrifluoroethylene, e.g., polychlorotrifluoroethylene (PCTFE); fluorinated ethylene-propylene polymers, e.g., tetrafluoroethylene-perfluoropropylene (FER); perfluoralcoxycopolymer (PFA) and hexafluoropropylene (HFP). This group is illustrative, with any compound from the group of fluorocarbon polymers which produces a non-wetting surface being applicable.

Usual amounts of polymerization inhibitors, such as the known nitrated phenolic compounds, may be introduced from inhibitor source 34 through line 36 into the crude vinyltoluene feed in line 2 or from inhibitor source 38 through line 40 into recycle column 4, or in any other desired manner.

Figure 2:
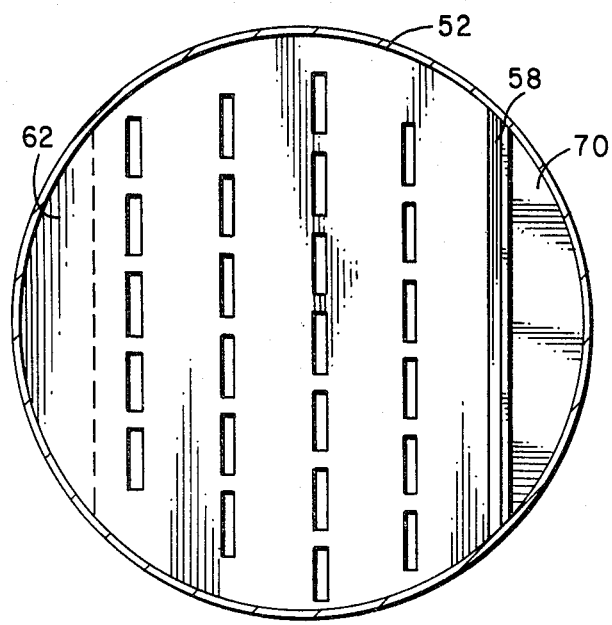
FIG. 2 is a top view of a perforated tray typically used in a distillation column for purifying vinylaromatic monomer.
Figure 3:
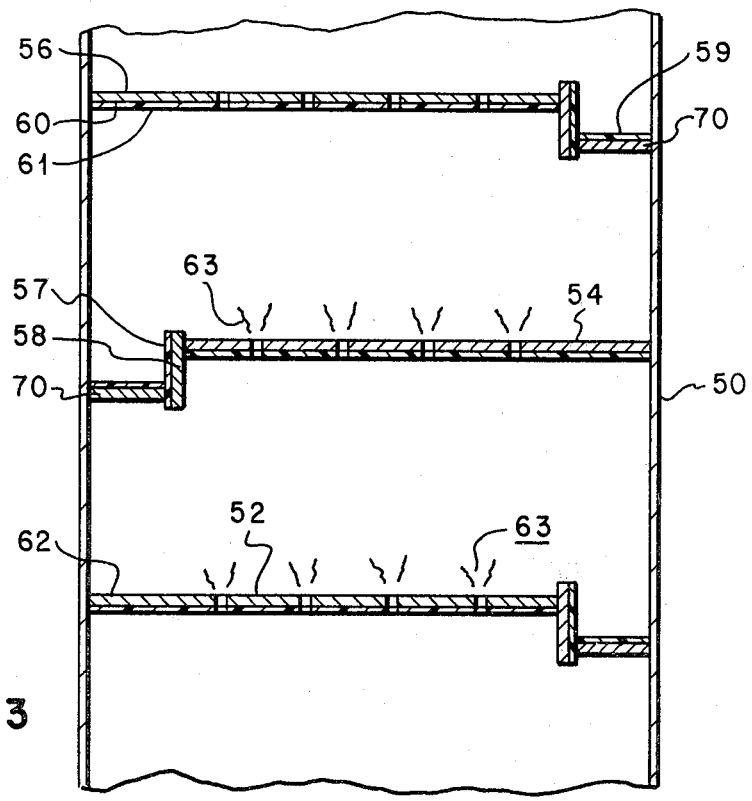
FIG. 3 is a schematic, sectional view of a portion of a distillation column for purifying vinylaromatic monomer.

FIGS. 2 and 3 disclose the tray and downcomer arrangement. The figures illustrate the use of perforated trays; however, the present invention is applicable to all types of trays used for distillation purposes.

FIG. 2 is a top view showing a conventional perforated tray, generally shown as 52, with a downcomer 58 and downcomer pan 70. The downcomer 58 is located on the peripheral edge of the tray 52. The pan area 70 adjacent the downcomer is closed and acts as a catch means for the fluid from the downcomer of the above tray as will be described in more detail below. The solid receiving tray surface 62 receives the condensed monomer from the downcomer pan 70 and distributes the monomer onto the adjacent tray surface, in the present case, tray surface 52.

FIG. 3 is a partial schematic sectional view of recycle column 4 showing a portion of the column wall 50 and three successive distillation trays 52, 54 and 56, respectively. A downcomer 58 and downcomer pan area 70 are provided with polytetrafluoroethylene surface coatings 57 and 59. The tray bottoms 60 have a polytetrafluoroethylene coating 61. The thickness of polytetrafluoroethylene coatings 57, 59 and 61 is not critical so long as it is thick enough to be sufficiently wear-resistant to provide service for an extended period of time.

During distillation in the column, vinyltoluene vapors 63 from tray 54 rise through the column toward tray 56. Vapors contacting the cool underside of the tray bottoms 60 condense, forming droplets on the tray bottoms. The droplets fall from the tray bottom 60 to the tray 54, a portion of the resulting liquid monomer on tray 54 is transported across the tray surface and into the downcomer 58 onto downcomer pan area 70. Flowing from the pan area 70, the liquid monomer is stopped by the solid tray receiving surface 62 from which it continues in a cross-flow direction over tray surface 52. This liquid is again contacted with rising vapor 63 and the cycle continues to the next descending tray.

As the droplets form in the downcomer pan area 70, and on the tray bottoms 60, they tend to collect, and polymerization results. Chemical inhibitors added to the vinyltoluene feed or to the distillation column, are not wholly effective to prevent polymerization of such droplets. Liquid phase inhibitors are not carried with the liquid monomer as it vaporizes, so that the condensate droplets formed from such vapors do not contain any of these polymerization inhibitors. Vapor phase inhibitors may not be effective due to lack of mixing as a result of low vapor velocity.

The presence of the polytetrafluoroethylene on the downcomers and/or tray bottoms provides a surface to which the liquid monomer cannot adhere and polymerize. The liquid will then fall without polymerization due to its own weight. Coatings of fluorocarbons, such as polytetrafluoroethylene, provide effective service at temperatures up to about 200° C., without undergoing serious degradation. Any minor absorption by the polytetrafluoroethylene coating is physical and may be removed, thus returning the coating to its original state.

Of course, other areas in the interior of the distillation column, besides the downcomers and the tray bottoms, where liquid tends to condense and concentrate and where low vapor velocities are encountered, may be provided with fluorocarbon polymer layers in accordance with the invention.

While the drawing illustrates the provision of a polytetrafluoroethylene layer in the recycle column for contacting vinylaromatic monomer during distillation thereof, it is understood, however, that polytetrafluoroethylene coatings or layers can also be provided at suitable locations in the finish column or in both the recycle and finish columns.

The polytetrafluoroethylene coating in contact with the vinyltoluene during the distillation thus inhibits the accumulation of undesired polymer in the distillation apparatus and increases the yield of the monomer. The distillation train can, therefore, be run for longer periods before shut-down for cleaning becomes necessary. The production of monomer is made more economical.

If polymerization does occur, the removal of the accumulated polymer is comparatively easy since the vinylaromatic polymer does not adhere to the fluorocarbon polymer surface like it does to a metal surface.

The following tests and example demonstrate the effectiveness of the present invention:

Test 1

A polytetrafluoroethylene coupon was placed in a beaker containing approximately 1 inch of finished vinyltoluene, and the beaker and contents were heated at approximately 120° C. for 4 hours to polymerize the vinyltoluene. After cooling, the beaker was broken and the polytetrafluoroethylene coupon completely separated from the polymer mass, with no agglomerates attached to its surfaces.

Test 2

A polytetrafluoroethylene coupon and a plain steel coupon were placed in a beaker containing approximately 1 inch of finished vinyltoluene. The sample was then heated at approximately 120° C. for 3 hours to polymerize the vinyltoluene. After cooling, the beaker was broken to remove the coupons. As in Test 1, the polytetrafluoroethylene coupon completely separated from the polymer mass; however, the polymer mass adhered to the metal coupon and was removed only with considerable effort.

EXAMPLE

The downcomer and the bottom of the 13th tray from the bottom of a 72 tray recycle column in a vinyltoluene distillation apparatus are coated with a layer of polytetrafluoroethylene. This has previously been an area of significant polymer buildup during normal operation. The steel surfaces of the remaining trays and downcomers are not provided with any coating. The recycle column is then placed in service in the distillation of crude vinyltoluene. The temperature in the top of the column is maintained at 65° C., and the temperature in the bottom of the column is maintained at 110° C. Pressure in the top of the column is 12 mm Hg, while the bottom of the column was operated at a pressure of 110 mm Hg.

The foregoing description and example have been set forth merely for purposes of exemplification and are not intended as limiting. Since modifications of the disclosed embodiments incorporating the spirit and substance of the invention may occur to persons skilled in the art, the scope of the invention is to be limited solely with respect to the appended claims and equivalents.

What is claimed is:

1. A method of inhibiting the formation of polymerized vinylaromatic compounds during distillative purification of vinylaromatic monomer from a crude feed comprising vinylaromatic monomer admixed with lower and higher boiling materials, said method comprising distilling said vinylaromatic monomer from said crude feed in a multitray distillation column equipped with vapor liquid contact trays provided with openings for upward passage of vapors therethrough and downcomers for downward passage of liquid from tray to tray wherein the downcomers and tray bottoms are coated with a fluorocarbon polymer.

2. A method according to claim 1, wherein said distillation is effected in a multi-column distillation train comprising a recycle column for separating lower boiling materials from vinylaromatic monomer and higher boiling materials and a finish column for separating vinylaromatic monomer from higher boiling materials.

3. A method according to claim 1, wherein said distillation is effected at subatmospheric pressure.

4. A method according to claim 3, wherein said distillation is effected at a temperature from about 65° C. to about 138° C. and an absolute pressure from about 0.013 atmosphere to about 0.26 atmosphere.

5. A method according to claim 4, wherein said temperature lies in the range from about 90° C. to about 115° C.

6. A method according to claim 1, wherein said distillation takes place in the presence of an effective amount of polymerization inhibitor.

7. A method according to claim 1, wherein the fluorocarbon polymer is polytetrafluoroethylene.

8. A method according to claim 1, wherein said vinylaromatic monomer is selected from the group consisting of styrene, vinyltoluene, alpha-alkylstyrene, and divinylbenzene.

9. A method according to claim 8, wherein said vinylaromatic monomer is vinyltoluene.

10. A method according to claim 8, wherein said vinylaromatic monomer is styrene.

11. Apparatus for inhibiting the formation of polymerized vinylaromatic compounds during distillative purification of vinylaromatic monomer from a crude feed comprising vinylaromatic monomer admixed with lower and higher boiling materials, said apparatus comprising a multi-tray distillation column equipped with vapor/liquid contact trays provided with openings for upward passage of vapors therethrough and downcomers for downward passage of liquid from tray to tray wherein the downcomers and tray bottoms are coated with a fluorocarbon polymer.

12. Apparatus according to claim 11, comprising a multi-column distillation train comprising a recycle column for separating lower boiling materials from vinylaromatic monomer and higher boiling materials and a finish column for separating vinylaromatic monomer from higher boiling materials.

13. Apparatus according to claim 11, further comprising means for maintaining said distillation column at subatmospheric pressure.

14. Apparatus according to claim 11, further comprising means for introducing a polymerization inhibitor into said apparatus.

15. Apparatus according to claim 11, wherein said fluorocarbon polymer is polytetrafluoroethylene.

* * * * *